United States Patent
Hsu et al.

(10) Patent No.: US 7,359,391 B2
(45) Date of Patent: Apr. 15, 2008

(54) MULTI-PORT NETWORK INTERFACE CIRCUIT AND RELATED METHOD FOR SCRAMBLING CODES OF DIFFERENT PORTS WITH DIFFERENT SEEDS AND RESETTING SIGNAL TRANSMISSION OF DIFFERENT PORTS AT DIFFERENT TIMES

(75) Inventors: Ming-Hsun Hsu, Taipei Hsien (TW); Chien-Cheng Chang, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 941 days.

(21) Appl. No.: 10/604,684

(22) Filed: Aug. 10, 2003

(65) Prior Publication Data

US 2005/0008036 A1    Jan. 13, 2005

(30) Foreign Application Priority Data

Jul. 7, 2003    (TW) .............................. 92118523 A

(51) Int. Cl.
*H04L 12/28*    (2006.01)

(52) U.S. Cl. ...................................... 370/401; 725/117
(58) Field of Classification Search ...................... None
See application file for complete search history.

(56) References Cited

U.S. PATENT DOCUMENTS

| | | | | |
|---|---|---|---|---|
| 3,649,915 A | * | 3/1972 | Mildonian, Jr. .............. | 375/286 |
| 4,639,548 A | * | 1/1987 | Oshima et al. ............... | 380/43 |
| 6,667,993 B1 | * | 12/2003 | Lippett et al. .............. | 370/509 |
| 2002/0138850 A1 | * | 9/2002 | Basil et al. ................. | 725/117 |
| 2003/0145196 A1 | * | 7/2003 | Heegard et al. ............ | 713/150 |

* cited by examiner

*Primary Examiner*—Huy D. Vu
*Assistant Examiner*—Toan Nguyen
(74) *Attorney, Agent, or Firm*—Winston Hsu

(57) ABSTRACT

A multi-port network interface circuit and related control method. The network interface circuit has a plurality of PHY circuits, each of the PHY circuit is used for transmitting signals to a plurality of corresponding network nodes via different ports. Each of the PHY circuits scrambles signals transmitted at different ports with different seeds, and the network interface circuit resets different PHY circuits at different times such that each of the PHY circuits starts to transmit signals at a different time.

15 Claims, 5 Drawing Sheets

MULTI-PORT NETWORK INTERFACE CIRCUIT AND RELATED METHOD FOR SCRAMBLING CODES OF DIFFERENT PORTS WITH DIFFERENT SEEDS AND RESETTING SIGNAL TRANSMISSION OF DIFFERENT PORTS AT DIFFERENT TIMES

BACKGROUND OF INVENTION

1. Field of the Invention

The present invention relates to a multi-port network interface circuit and a related method, and more particularly, to a multi-port network interface circuit and a related method for scrambling signals of different ports with different seeds, and making the data transitions of different ports asynchronous by adopting different reset times.

2. Description of the Prior Art

In the modern information age, the Internet, capable of exchanging information, data, and knowledge efficiently, is becoming a very popular tool to develop new technologies and to improve relations among people. That is why it has become a major concern for the information industry as well as governments to develop facilities related to the Internet as fast and thoroughly as possible.

A variety of network connection topologies have been used to build networks formed with a plurality of terminals. Each of the terminals in these topologies can be deemed as a node of the network and connections between these nodes, directly and indirectly, make up the network. For example, 10 BASE T and 100 BASE T, two popular patterns of local area networks, both adopt a star-structured topology to build a network, each of the terminals connecting to the rest of the nodes or to another network device (hubs, switches, or routers) via a hub or a switch to form a network and to exchange data with network-related devices in the network. In other words, network-related devices, such as hubs, switches, and routers, interconnect with the nodes (terminals) to form a network so that users of any terminal can access data of the rest of the terminals via the network.

These network-related devices used to interconnect the nodes in the network usually contain network connection ports, each network connection port being connected to only one node or other network device. These network devices can, therefore, transmit data signals with a network interface circuit to each of the network nodes via a corresponding network connection port and receive data transmitted from the network nodes, thus realizing internetwork connection. Please refer to FIG. 1, which is a functional block diagram of a conventional multiple-port network interface circuit 10. The network interface circuit 10 can be a network interface circuit utilized in a network device, such as a hub, a switch, or a router. The network interface circuit 10 includes a MAC (Medium Access Control) circuit 12 for transmitting and receiving signals to and from many nodes with a plurality of multi-port PHY circuits. For simplification, in the representative example in FIG. 1, it is assumed that there are two PHY circuits, 14A and 14B, each able to exchange information with two nodes (terminals) such that the network interface circuit 10 is capable of exchanging information with 4 nodes, 24A to 24D, respectively and simultaneously. It is practical in the modern network interface circuit to combine three eight-port PHY circuits to realize a 24-port network interface circuit.

In the network interface circuit 10, the MAC circuit 12 is used to control the signal transmission of each PHY circuit to each node for realizing the function of the MAC layer under the OSI (Open System Interconnection) structure, and the PHY circuits 14A and 14B are utilized to realize the function of the PHY layer. The data to be transmitted to node 24A to 24D is packeted by the MAC circuit 12 and transmitted to the PHY circuit 14A and 14B through four output ports, Ep1 to Ep4. As shown in FIG. 1, scramblers 16A to 16D and encoders 18A to 18D are included in the PHY circuit 14A and 14B for processing the packets that are to be transmitted to the node 24A to 24D. In addition, the signals coming back from the node 24A to 24D are transmitted to the network interface circuit 10 through input ports 22A to 22D to receivers 30A and 30B, and further transmitted back to the MAC circuit 12 after being processed by the receivers 30A and 30B. When realizing the network interface circuit 10 in FIG. 1, the signals are differentially transmitted to corresponding nodes in twisted pair lines. Similarly, each node transmits the data back to a corresponding input port of the network interface circuit 10 in differential manner (such as opposite phase). In addition to transmitting and receiving signals to and from the nodes 24A to 24D through the PHY circuits 14A and 14B, the MAC circuit 12 controls the function of the PHY circuits 14A and 14B by sending commands to control ports CL1 and CL2 of the PHY circuits 14A and 14B. Further provided are reset ends RS1 and RS2, in the PHY circuits 14A and 14B respectively. As illustrated in FIG. 1, a reset circuit 26 triggers the reset signal of the PHY circuits 14A and 14B simultaneously to initialize the control course, the state machine, and the data in the registers and restart the function of the network interface circuit 10.

The operation of the network interface circuit 10 can be further described as follows. For example, if there is data to transmit to the node 24A by the MAC circuit 12, the MAC circuit 12 appends information such as a header, a MAC address, and an error checking code to a packet of the data. This packet is then transmitted as a signal Mp1 to the scrambler 16A in the PHY circuit 14A through the output port Ep1. The scrambler 16A has a random number generator 32A which chooses a seed among a plurality of seeds from Sp(1) to Sp(N) to generate a scrambling code Sc0, and the scrambler 16A executes a logic operation OP0 on Sc0 and MP1 to produce a scrambled signal Np1. The scrambled signal Np1 is further transmitted to an encoder 18A to be encoded, modulated, or amplified by the encoder 18A. The output signal Kp1 of the encoder 18A is transmitted to the node 24A through an output port 20A. The signals transmitted by the node 24A through the input port 22A are received, demodulated, decoded, and de-scrambled to the original packets by the receiving circuit 30A, and then transmitted back to the MAC circuit 12 and de-packeted by it. Similarly, the scramblers 16B to 16D execute the logic operation OP0 with scrambling codes generated by corresponding random number generators 32B to 32D respectively and packets Mp2 to Mp4 which are to be transmitted to nodes 24B to 24D to generate the signals Np2 to Np4 separately. After scrambling, the signals Np2 to Np4 are then encoded by the encoders 18B to 18D and are transmitted to corresponding nodes 24B to 24D.

In the network interface circuit 10, when exchanging data with a node, such as node 24A for example, the scrambler 16A changes the seed adopted by the random number generator 32A at every predetermined period. For example, at a certain moment, the random number generator 32A adopts the seed Sp(1) to generate the scrambling code Sc0 to scramble the signal Mp1. After the predetermined time, the random number generator 32A adopts the seed Sp(2) to generate the scrambling code Sc0. And after another predetermined period, the random number generator 32A adopts the seed Sp(3) to generate the scrambling code Sc0. The seeds are adopted in turn like this. After the last seed Sp(N) is adopted, the random number generator 32A reuses the seeds in turn again. Please refer to FIG. 2. The scrambler 16A in FIG. 1 is taken as an example here to illustrate the function of each scrambler in the network interface circuit 10. In the scrambler 16A, the random number generator 32A uses a plurality of registers 34 to temporarily store the bits of a seed, seed Sp(n) for example, and executes a shifting and exclusive OR operation 36 to generate the scrambling code Sc0. The scrambling code Sc0 is then affected by the logic operation OP0 with the signal Mp1 for generating the scrambled signal Np1. The signal Np1 is then encoded by the encoder 18A to produce the corresponding signal Kp1.

Please refer to FIG. 1 again. When the encoded and scrambled signal Kp1 is received by the node 24A, it is first decoded, that is, recovered to the signal Np1, and then descrambled, that is, recovered to the signal Mp1, for recovering to the transmission packets to the node 24A from the network interface circuit 10. There are established standards for encoding and decoding in the network protocol. As long as the two sides of the network connection adopt the same network protocol, the encoded signals can be decoded successfully. The standard of the operation of the random number generator 32A, the logic operation OP0, and the values of the seed Sp(1) to Sp(N) are also given by the network protocol. However, the receiver does not know what seed the transmitter adopts for generating the scrambling code. For example, when the network interface circuit 10 starts to transmit signals to the node 24A, it may start from the seed Sp(2) to generate the scrambling code Sc0, and change the seed at every predetermined period. Since the network interface circuit 10 does not notify the node 24A which seed the scrambler 16A uses, the node 24A is not able to de-scramble the scrambled signals. The network interface circuit 10 has to establish a link with the node 24A so the node 24A can de-scramble the signals successfully. For the purpose above, the MAC circuit 12 takes a predetermined idle pattern signal, for example, a predetermined number of successive 0s, as the signal Mp1. The signal Mp1 is scrambled, encoded, and then transmitted to the node 24A. According to the network protocol, the node 24A knows the first transmitted signal is the idle pattern signal, and it knows the content of the idle pattern signal. Therefore, the node 24A can recover the seed adopted by the scrambler of the network interface circuit 10. Knowing the seed adopted by the scrambler 16A, the node 24A can descramble the signal Np1 to the signal Mp1 and recover the packet transmitted by the network interface circuit 10. After a predetermined period, the scrambler 16A will use the next seed for scrambling, and the node 24A knows what the next seed is by the network protocol. In addition to sending the idle pattern data, the two sides of the network connection recognize the transmission status, like whether the link is shut down or not, by sending the idle pattern signals during transmission. In the conventional network interface circuit 10, each of the scramblers 16A to 16D starts with the same seed Sp(1), and the order of the seed sequence is the same.

In the network interface circuit, the purposes of scrambling and encoding are making the electrical characteristics of the transmission signal better. In a network, especially an area network, the DC part of the transmission signals is filtered during the transmission. The waveforms of successive 0 or 1 bit data in the transmission signal, such as "00000000" or "11111111", are a successive straight lines with different DC levels. For instance, the waveform of eight successive 0s is a low level DC signal continuing for eight clock cycles, and the waveform of eight successive 1s is a high level DC signal continuing for eight clock cycles. Once the DC part is filtered during the transmission, the high level DC signal is filtered out and the receiver can no longer ascertain whether the received signals are successive 0s or 1s. This is so-called baseline wander. To avoid the successive 0s or 1s in the transmission signal, scrambling and encoding are adopted before transmitting the signals to interlace the 0 and 1 bit data.

Please refer to FIG. 3 and FIG. 1. FIG. 3 is the timing diagram of the related signals of the operation of the network interface circuit 10 shown in FIG. 1. The X dimension is time, and the Y dimension the amplitude of the waves. Generally speaking, the control process, the state machine, and the registers are initialized whenever a sequential logic circuit starts to operate. When the network interface circuit 10 in FIG. 1 starts to operate, the reset circuit 26 sends a signal 28 to reset and initialize the PHY circuits 14A and 14B simultaneously. For example, the scrambler 16A to 16D starts to scramble with the seed Sp(1) uniformly. As illustrated in FIG. 3, since the PHY circuits 14A and 14B are reset to start operation at the same time, the signals Mp1 to Mp4 are scrambled by the scramblers 16A to 16D simultaneously. Therefore, the data transition times of the signal Mp1 to Mp4 are all equal. For instance, as demonstrated in FIG. 3, the signals Mp1 and Mp2 change from a digital 1 to a 0 at tp0, and the signals Mp3 and Mp4 change from a digital 0 to a 1 at tp1, etc. Besides, as described above, the network interface circuit 10 sends fixed idle pattern signals to each node when the links are established or re-recognized. So, it is very possible that the signals transmitted from the MAC circuit 12 to the scramblers 16A to 16D are the same during these times, as shown by the signals Mp1 to Mp4 in FIG. 3 before tp0.

Though the successive 0s or 1s in the scrambled signals Np1 to Np4 will be scattered after scrambling, the data transition times of signals Np1 to Np4 are still the same because the signals Mp1 to Mp4 are identical before time tp0, and the initial seeds of the scramblers 16A to 16D are equal in the conventional network interface circuit 10. For example, the signals Np1 to Np4 change from a digital 0 to a 1 at time tp3 simultaneously. The signals Np1 to Np4 are encoded to the signals Kp1 to Kp4 by the encoders 18A to 18D respectively. Since the signals Np1 to Np4 are equal before time tp0, the encoded signals Kp1 to Kp4 are identical, too. Because of the same reset time of the PHY circuits 14A and 14B, the data transition times of the signals Kp1 to Kp4 are equal. For instance, at time tp5, the bit data of the signals Kp1 to Kp4 change from 0 to 1 simultaneously, and further, from 0 to 1 at time tp6 simultaneously.

Power is needed to drive the data transition for scrambling, encoding, or transmitting signals through the network transmission line to the remote node. For example, the DC biasing source of the network interface circuit 10 has to drive the output load to pull up the output signal level when the output signal changes from a low level to a high level. Similarly, the DC biasing source has to pull down the output load to the ground of the network interface circuit 10 to pull down the output signal level when the output signal changes from a high level to a low level. In other words, the current of the DC biasing source or the discharging current to the ground has to be increased when a circuit drives the data transition of the signal. On the contrary, the power consumption and the current are decreased dramatically when the signal level is maintained after the data transition. For the network interface circuit, the scramblers and the encoders ask for more charging or discharging current at the data transition. However, in a conventional network interface circuit 10, the data transitions of the signals Np1 to Np4, Kp1 to Kp4 are at the same time, and it is very possible that the transmitted data of the signals are equal because the scrambling seeds of each port are the same. So, the total power consumption and the current of the PHY circuits 14A and 14B increase simultaneously. This substantially increases the need of DC biasing current and discharging current to ground resulting in power bounce. In general, the network interface circuit 10 uses an external DC biasing source to provide power. If all the circuits in the network interface circuit 10 require an increase in power for simultaneously driving the same kind of data transition, the external DC biasing source is unable to answer the request immediately and smoothly and hence a ripple response results. Therefore, the DC biasing source is unable to supply the current stably, and the quality of the network interface circuit 10 operation is reduced. Likewise, if discharging currents to the ground for each circuit increase simultaneously, the potential of the ground may be changed by the current impulse causing the bias of the transistors in the network interface circuit 10 to drift such that inappropriate operation may appear.

In addition to power bounce, the simultaneous data transitions of the conventional network interface circuit 10 cause cross talk among the transmission lines. For example, when the signals Kp2 and Kp3 are simultaneously pulled up to the high level at time tp5, some part of the energy of the signal Kp2 may couple to the signal Kp3 because of the constructive electrical coupling between the circuits 16A and 16B (or say the electrical coupling caused by the equal phase), so the level of the signal Kp3 may be raised higher than the level of a digital 1, as the dotted line 37a illustrates in FIG. 3. In other words, after reaching the predetermined level of a digital 1, the level of the signal Kp3 keeps increasing and may exceed the upper limit of the signal level and damage the circuit. Similarly, at time tp7, the signal Kp2 changes from the low level to the high level and the signal Kp3 changes from high to low simultaneously. The signal Kp3 may not be capable of reaching a level which is low enough to represent the digital 0 or may require longer time to reach the predetermined low level when it changes from high to low because some part of the increased energy of the signal Kp2 couples to the signal Kp3, as the dotted line 37c illustrates. On the contrary, the signal Kp2 may be not capable of reaching the predetermined high level or may take a longer time to reach it because some part of its increased energy couples to the signal Kp3, as the dotted line 37b illustrates. Once there are distortion and delay in the waveforms of the signals Kp1 to Kp4 as described above, erroneous judgment of the data and problems in synchronization of the signals follow.

To sum up, for a conventional multi-port network interface circuit 10, the PHY circuits are reset simultaneously and start to operate at the same time, and each scrambler in the PHY circuits starts with the same seed so that data transitions happen at the same time. This causes power bounce and cross talk, and therefore, unstable power and distortion of the signal waveforms. This is even more serious in current networks since speed of data transmission is higher and the number of transmitted data bits is increased meaning the transitions in a unit of time unit are also increased. This causes the time margin of the conventional network interface circuit 10 for recovering from power bounce to be shorter, and the problem of the power bounce, electrical coupling, and the distortion of the waveform to be more severe.

SUMMARY OF INVENTION

It is therefore a primary objective of the claimed invention to provide a network interface circuit using different reset circuit, and/or using different initial seeds for scrambling in different ports and different reset times for triggering different multi-port PHY to avoid the simultaneous data transitions, and/or to reduce the defects of the conventional technology, such as power bounce and cross talk.

According to the prior art, the initial scrambling seeds of different ports in each PHY circuit are all the same and each PHY circuit starts transmission simultaneously. Therefore, it is very possible for the data transitions of different ports in the conventional network interface circuit to be simultaneous. Hence, power bounce and cross talk result.

In the claimed invention, different seeds are adopted for scrambling the signals of each port in each PHY circuit, the different PHY circuits are reset at different times, or different scramblers are utilized for scrambling, so that each PHY circuit is reset at different time for reducing the possibility of simultaneous data transitions among the different ports, hence the defects of power bounce and cross talk is decreased.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
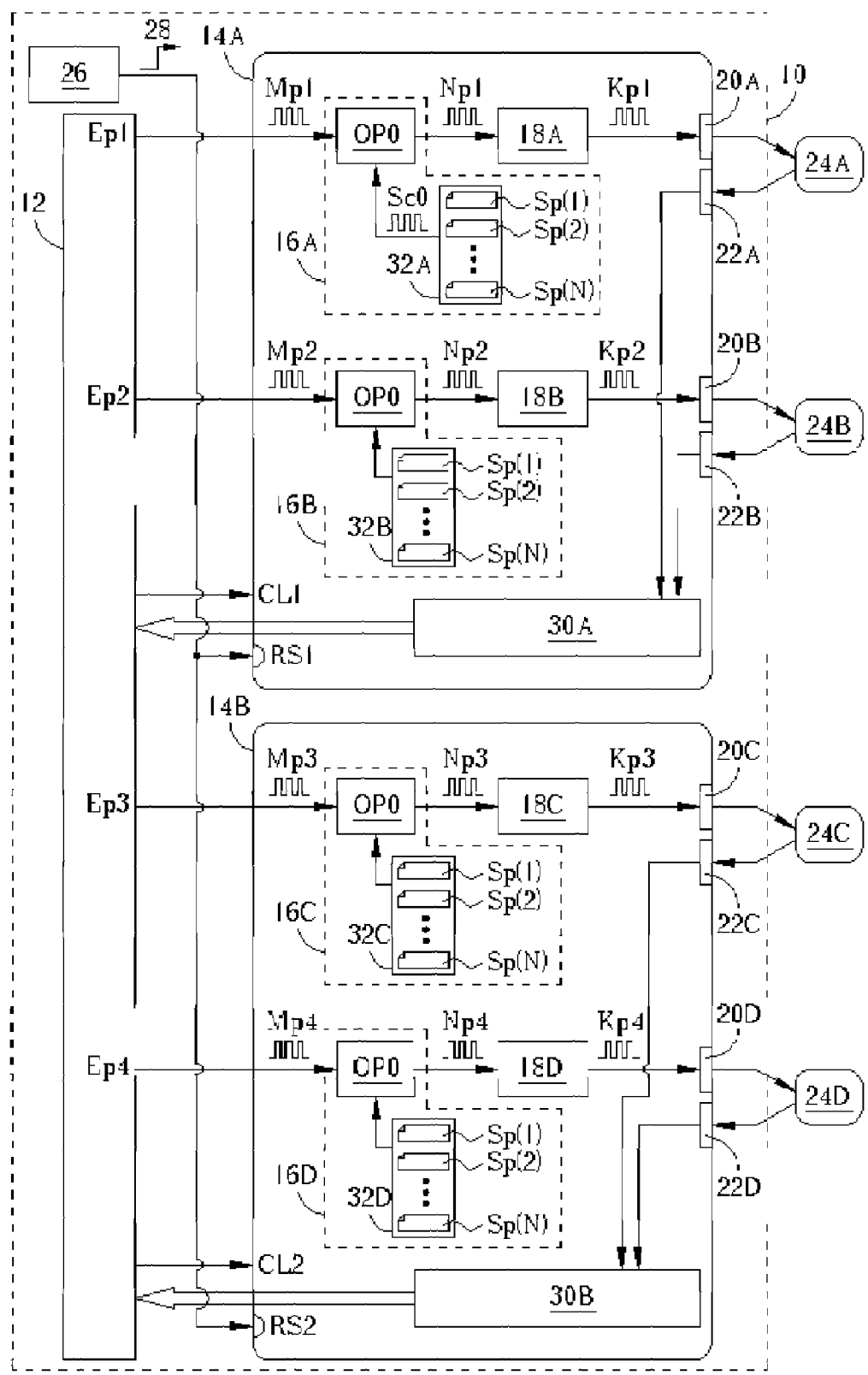
FIG. 1 is a block diagram of a network interface circuit according to the prior art.

Before we discuss the multi-port interface circuit we bring up here specifically and explain how the hardware of this multi-port interface circuit can realize the related control method, we briefly introduce the related control method in this invention and emphasize that the key point of the control method is not the realization of the hardware but the flow path, especially the critical steps of making the switching time of data transmission of each port different.

The control method can be a method applied to a network interface circuit for controlling the signal transmission of the network interface circuit to transmit signals to different nodes of the network. First, a first signal and a first scrambling code are executed with a first logical operation to generate a first transmission signal, and a second signal and a second scrambling code are executed with the first logical operation to generate a second transmission signal. The second scrambling code is different from the first scrambling code, so that the first transmission signal is different from the second transmission signal. Finally, the first transmission signal and the second transmission signal are transmitted to the corresponding nodes in the network respectively. The first logical operation can be an exclusive OR operation.

Here, the first scrambling code is usually generated by executing a second logical operation to a first seed, and the second scrambling code is usually generated by executing a second logical operation to a second seed. Here the first seed is different with the second seed, so the first scrambling code is different from the second scrambling code. Usually the value of the first seed is updated after a predetermined time after the first transmission signal is generated, and the value of the second seed is updated after a predetermined time after the second transmission signal is generated. Usually the first transmission signal is generated after receiving a first reset signal and the second transmission signal is generated after receiving a second reset signal, and the first reset signal and the second reset signal turn on the processes of generating the first scrambling code and the second scrambling code at different times, so that the first transmission signal and the second transmission signal are generated at different times. Generally, the first seed is set to an initial value when receiving the first reset signal, and the second seed is set to another initial value when receiving the second reset signal.

Furthermore, the ways to encode the first transmission signal and the second transmission signal are usually the same, and the two transmission ports are utilized to transmit the coded first transmission signal and the coded second transmission signal to the corresponding nodes respectively. Here, the manner is often to encode a digital signal composed of 0 and 1 values to one composed of 0, 1, and 1 values.

The control method can also be a method applied to a network interface circuit for controlling the signal transmission of the network interface circuit to transmit signals to different nodes of the network. First, the first reset signal and the second reset signal are received; then a first signal and a first scrambling code are executed with a first logical operation to generate a first transmission signal right after the first reset signal is received, and a second signal and a second scrambling code are executed with the first logical operation to generate a second transmission signal right after the second reset signal is received, wherein the second transmission signal and the first transmission signal are different. Finally the first transmission signal and the second transmission signal transmission signal are transmitted to the corresponding nodes in the network respectively.

There are two common methods to make the first transmission signal different from the second transmission signal. One is to make the first scrambling code different from the second scrambling code, that is, to make the first transmission signal and the second transmission signal different. Another method is to generate the first reset signal and the second reset signal at different times, so that the time to generate the first transmission signal and the second transmission signal are different.

The following is the block diagram of the network interface circuit 50 in this invention. Similar to the network interface circuit 10 in FIG. 1, the multi-port network interface circuit 50 can be a hub or a switch, and is utilized to exchange the data and signals with different nodes. And the network interface circuit 50 can utilize a MAC circuit 52 cooperating with a plurality of multi-port PHY circuits to exchange data with different nodes. For simplification, within the representative embodiment of the present invention in FIG. 4, the multi-port network interface circuit 50 includes a MAC circuit 52 and two PHY circuits 54A and 54B, wherein each PHY circuit can connect to two network nodes, so the network interface circuit 50 in FIG. 4 can exchange data to nodes 64A and 64B simultaneously. Similar to the function of the network interface circuit 10 in FIG. 1, the transmission data to each node is packeted by the MAC circuit 52, and transmitted to the PHY circuits 54A and 54B through output ports E1 to E4. For the nodes 64A to 64D, the PHY circuits 54A and 54B contain scramblers 56A to 56D and encoders 58A to 58D for scrambling and encoding the transmission data packet. The scrambled and encoded packets are then transmitted through corresponding transmission ports 60A to 60D to the nodes 64A to 64D. The signals transmitted back from the nodes 64A to 64D to the network interface circuit 50 is received through input ports 62A to 62D and then transmitted to receiving circuits 70A and 70B for decoding and de-scrambling. After recovering the packets from the received signal, the receiving circuits 70A and 70B pass the packets to the MAC circuit 52 for de-packeting and recovering the data from the nodes 64A to 64D.

Figure 2:
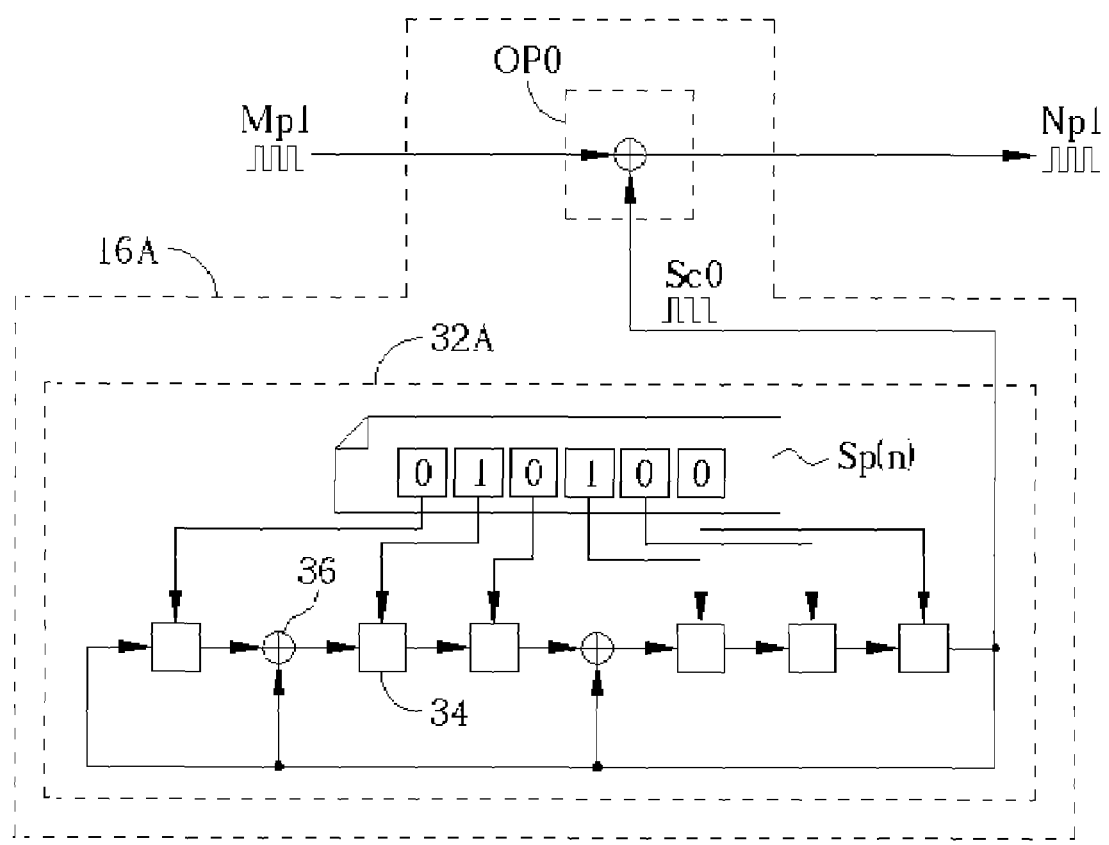
FIG. 2 is a block diagram of the scrambler shown in FIG. 1.
Figure 3:
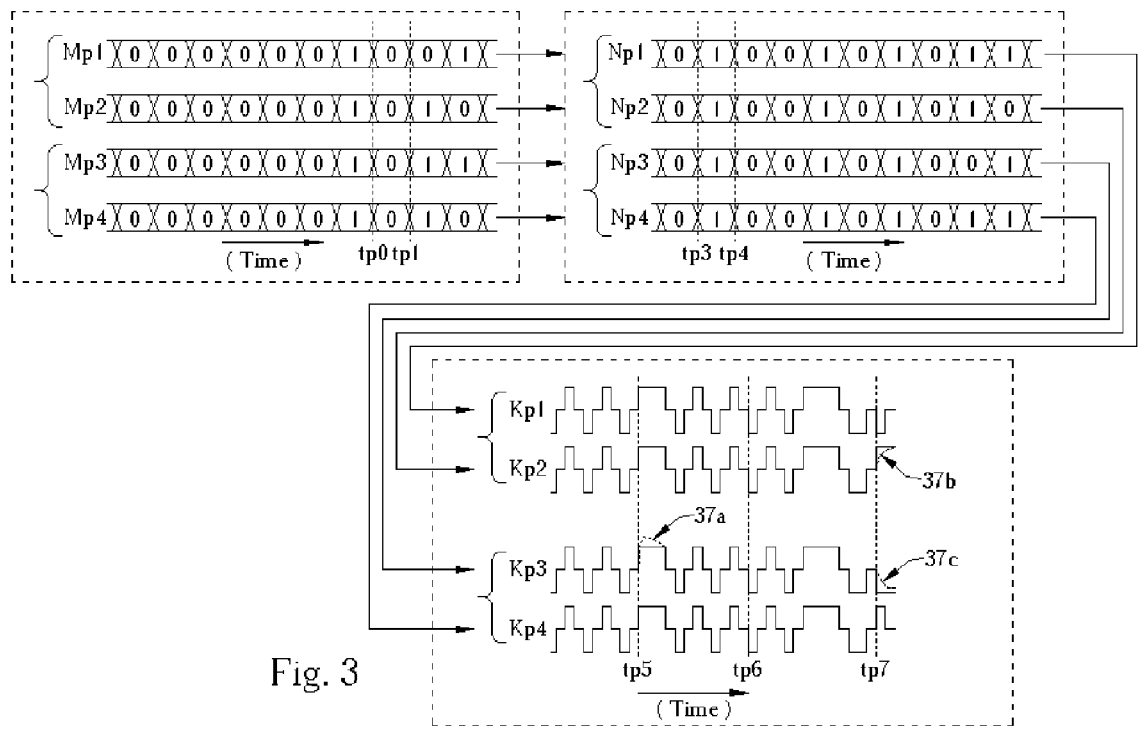
FIG. 3 is a timing diagram of the related signals of the operation of the network interface circuit shown in FIG. 1.

Similar to the PHY circuits 14A and 14B in FIG. 1, in the network interface circuit 50, there are control ports CL3 and CL4 included in the PHY circuits 54A and 54B respectively to accept commands from the MAC circuit 52 for signal processing. Likewise, further included are reset ends RS3 and RS4 in the PHY circuits 54A and 54B respectively. When getting a reset signal from the corresponding reset end, the sequential control procedure, the state machine, the registers, and so on are reset to the initial values and the operation is restarted. Besides, like the arrangement of the PHY circuits 14A and 14B in FIG. 1, the scramblers 56A to 56D in the PHY circuits 54A and 54B utilize random number generators 72A to 72D for scrambling according to the seeds. After the data packets, that is, the signals M1 to M4, are transmitted to the corresponding scrambler 56A to 56D from the MAC circuit 52, the random number generators 72A to 72D generate the scrambling codes and execute the logic operation OP with the scrambling code and each of the signals M1 to M4 to produce corresponding scrambled signals N1 to N4. The encoders 58A to 58D encode the signals N1 to N4 and buffer them to generate signals K1 to K4, and then transmit them to the nodes 64A to 64D through the corresponding transmission ports 60A to 60D. Like the operation of the scrambler 16A in FIG. 2, the scramblers 56A to 56D utilize the shift register to generate the scrambling code with one seed among $Sp(1)$, $Sp(2)$, $Sp(3)$, and to $Sp(N)$, and then execute the exclusive OR operation with signals M1 to M4 respectively to generate the corresponding signals N1 to N4.

Figure 4:
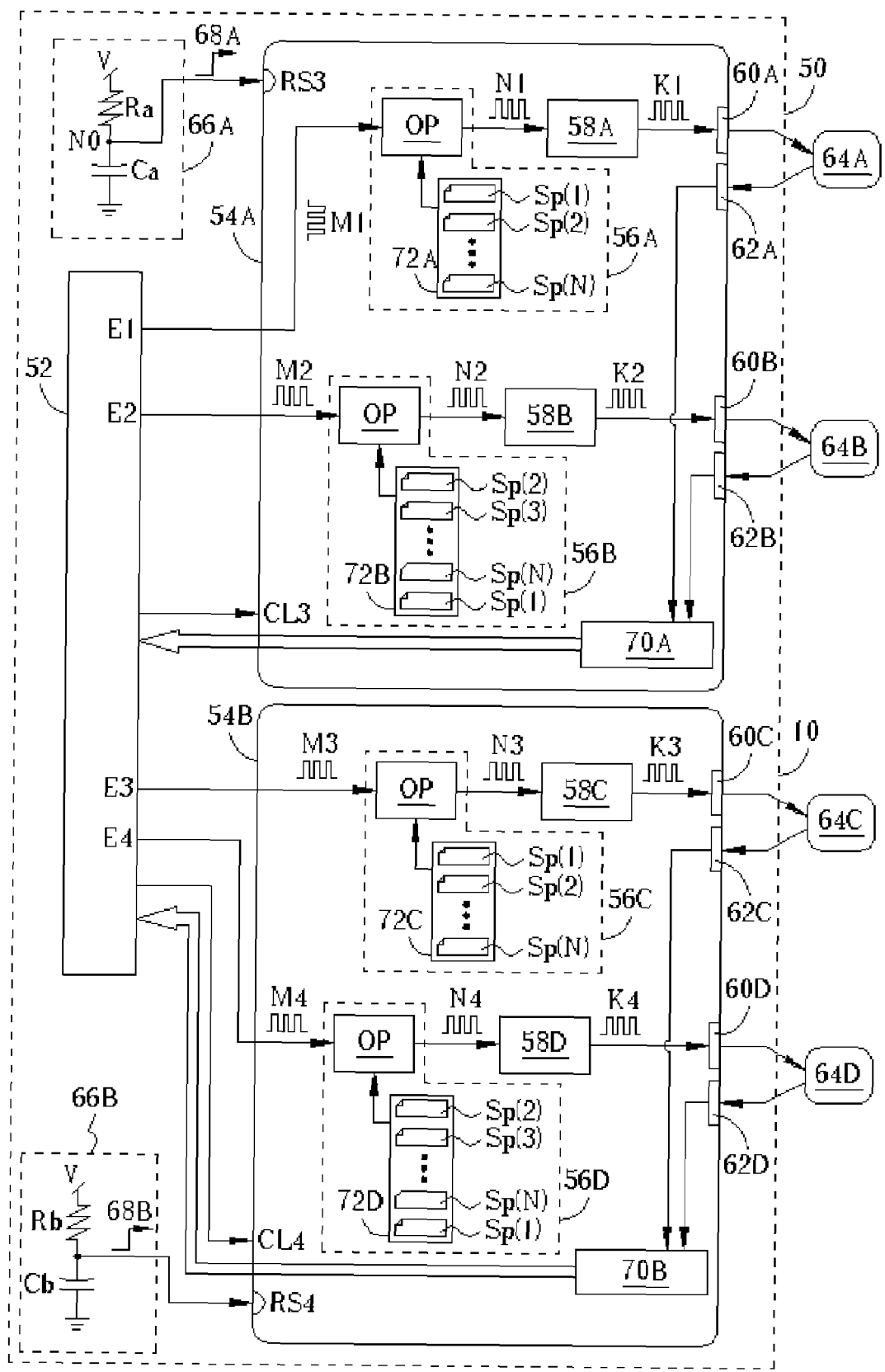
FIG. 4 is a block diagram of a network interface circuit according to the present invention.

To reduce the defects of power bounce and cross talk found in the prior art, there are two main differences between the present invention and the prior art. First, the network interface circuit 50 in the present invention could reset different PHY circuits at different times, so each PHY circuit starts to operate at a different time. There are two ways to realize the interlacing of the reset times of different PHY circuits. As illustrated in FIG. 4, in the present invention, different reset circuits 66A and 66B are set as the control circuits of the PHY circuits 54A and 54B respectively. Reset signals 68A and 68B are utilized to trigger reset ends RS3 and RS4 for resetting the PHY circuits. Assuming the PHY circuits in FIG. 4 get reset when receiving a digital 1 as a reset signal, the reset circuits 66A and 66B generate corresponding reset signals 68A and 68B with resistors Ra and Rb and capacitors Ca and Cb under the DC voltage biasing source respectively, as illustrated in FIG. 4. The DC voltage source V can be the DC biasing voltage source of the network interface circuit 50. When the network interface circuit 50 starts to function, the DC voltage source V charges the capacitors Ca and Cb through the resistors Ra and Rb respectively. Taking the reset circuit 66A for example, the potential of the capacitor Ca at node N0 is charged from the low level to the high level, and the reset signal 68A then changes from a digital 0 to digital 1. It is known that, as the product of the capacitor and the resistor changes in a charging circuit, the time constant of the circuit changes. In other words, as long as the products of the capacitor and the resistor in the reset circuits 66A and 66B, Ra*Ca and Rb*Cb, are different, the reset signals 68A and 68B change from digital 0s to digital 1s at different times, and hence the PHY circuit 54A and 54B are reset at different times. In addition, the MAC circuit 52 controls the PHY circuits to reset by sending commands to the control ports CL3 and CL4. As long as the MAC circuit 52 could send the reset commands at different times, the PHY circuit 54A and 54B can reset at different times.

The other difference between the present invention and the prior art is that the present invention could utilize different seeds in different scramblers. Accordingly, even the signals are exactly the same, they will be different after being scrambled by different scramblers because the scrambling seeds are not equal. As described above, when the scrambler scrambling, it changes the seed at every predetermined period, and the value and the order of each seed are regulated in the network protocol. Since the seeds are utilized in turn repeatedly, as long as the initial seeds of each scrambler are different, the seeds of each scrambler are always different. For example, as illustrated in FIG. 4, the scrambler 72A takes the seed Sp(1) as its initial seed, that means, the scrambler 72A first uses the seed Sp(1) for scrambling when it starts to function after the PHY circuit 54A is reset; it will change to Sp(2), Sp(3), and so on every determined period. After the last seed Sp(N) is used, it will start to use the seed Sp(1) again. To realize the preset invention, the scrambler 72B may utilize the seed Sp(2) as its initial seed and scramble with the seed Sp(2) when the scrambler 72A scrambles with the seed Sp(1). When the scrambler 72A changes to use the seed Sp(2) and Sp(3) and so on in turn, the scrambler 72B changes to use the seed Sp(3) and Sp(4) and so on in turn synchronously, so the scramblers 72A and 72B always use different seeds to scramble. Of course, each scrambler in each PHY circuit in the network interface circuit 50 can have different initial seeds to scramble.

Figure 5:
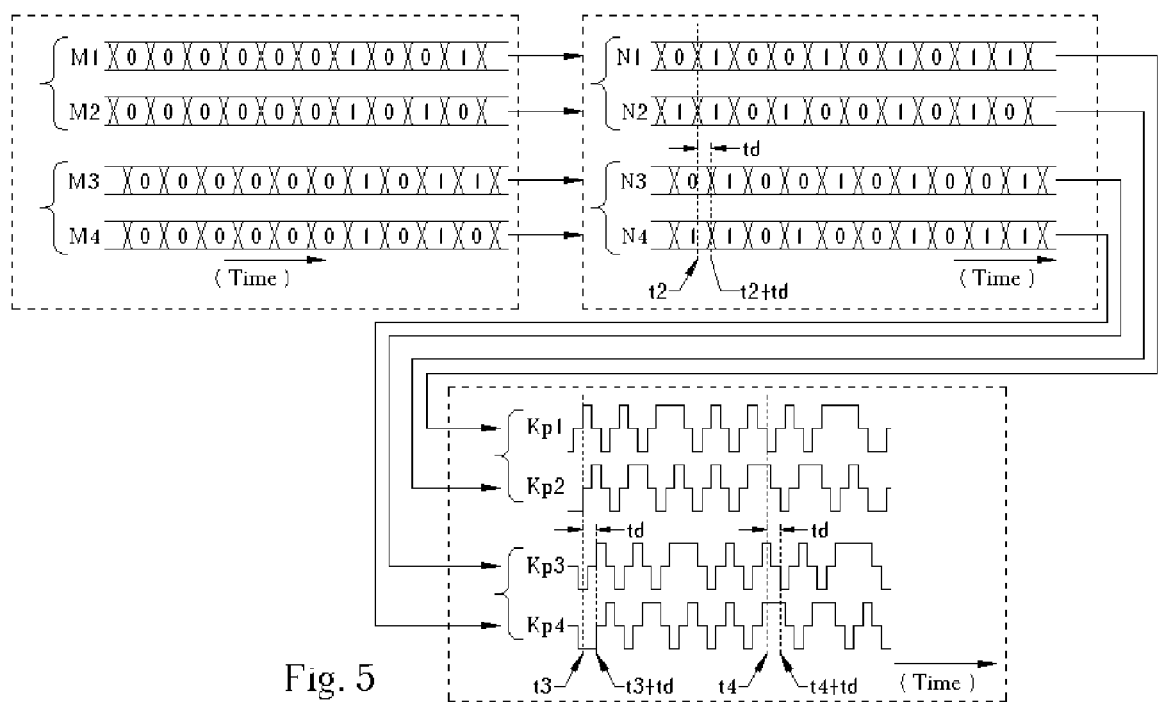
FIG. 5 is a timing diagram of the related signals of the operation of the network interface circuit shown in FIG. 4.

Please refer to FIG. 5 and FIG. 4. FIG. 5 is a timing diagram of the related signals of the operation of the network interface circuit shown in FIG. 4. The X dimension is time, and the Y dimension is amplitude of the waves. As illustrated in FIG. 5, in the present invention, since the PHY circuits 54A and 54B are reset to function at different times, they receive signals M1 to M2 and M3 to M4 at different times, and scramble them to generate signals N1 to N2 and N3 to N4 at different times. Assuming the PHY circuit 54B is reset after a period td, there is a time difference td between the signals of the PHY circuits 54A and 54B, especially where the data changes. As shown in FIG. 5, the signals N1 and N2 of the PHY circuit 54A change at time t2, and the signal N3 and N4 of the PHY circuit 54B change at time t2+td. In addition, as illustrated in FIG. 5, since the seeds of the scrambler 56A and 56B are different, even when there are some identical data in the signals M1 and M2, such as idle pattern data, the corresponding scrambled signals N1 and N2 are different, and the possibility of simultaneous data transition is reduced substantially. As illustrated in FIG. 5, since the encoded signals K1 to K4, for example, encoded by MLT-3 code, utilize different scrambling seeds, the possibility of simultaneous data transition is reduced effectively even when the signals K1 and K2 which are derived from two equal signals M1 and M2 in the same PHY circuit. For different PHY circuits, since each PHY circuit is reset at a different time, the data transitions of the signals in different PHY circuits are not simultaneous. As shown in FIG. 5, the data of signals K1 and K2 in the PHY circuit 54A change at time t3; and for the PHY circuit 54B, the reset time of which is td after time t3, the data of its signals K3 and K4 change at time t3+td.

From the above-mentioned, in the network interface circuit 50 in the present invention, since the data transitions of the signals in different PHY circuits are not at the same time, the possibility of equal data transition among the signals of each PHY circuit is reduced effectively, such that the defects of power bounce and cross talk in the network interface circuit 50 are decreased substantially. In the present invention, since the times of data transition in different PHY circuits are interlaced, the total power of the network interface circuit 50 does not increase suddenly, and the defect of power bounce is decreased. Similarly, in each PHY circuit, since the scrambling seeds of each port are different, the possibility of identical data transition among the signals is decreased effectively. Therefore, the requirement for the PHY circuit to dramatically increase the DC biasing current source or the current to the ground is avoided, and the operation of the PHY circuit is kept stable. In addition, since the data transition times of each signal are staggered, the problem of cross talk in the signal transmission is reduced substantially.

In contrary, in the prior art, different PHY circuits are reset to operate at the same time, and the scrambling seeds of each port in each PHY circuit are equal, so data transitions, especially identical data transitions, of the signals of different ports are simultaneous. Therefore, in the conventional network interface circuit, the requirements of power, DC biasing current, and the current to the ground increase suddenly and dramatically. In addition, electrical coupling in the data transition is increased and causes cross talk. As mentioned before, it is now practicable to combine three 8-port PHY circuits to realize a 24-port network interface circuit, and the effects of power bounce and the cross talk cannot be ignored. In contrast, the present invention resets different PHY circuits at different times, and hence interlaces the data transition times of each PHY circuit. Furthermore, different scrambling seeds are utilized in different PHY circuits to reduce the possibility of identical signal data transitions. Therefore, electrical characteristics such as requirements of power and current in the network interface circuit of the present invention do not change dramatically, the state of the circuit remains stable, and power bounce is reduced. Moreover, the effect of cross talk among the signals is decreased substantially, and the quality of the network transmission is improved.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A network interface circuit for transmitting signals to different nodes of a network, the network interface circuit comprising:
   a MAC circuit;
   a first scrambler coupled to the MAC circuit for generating a first transmission signal by executing a logic operation with a first signal and a first scrambling code, the first scrambler comprising a first random number generator for executing a second logic operation with a first seed to generate the first scrambling code;

a second scrambler coupled to the MAC circuit for generating a second transmission signal by executing the logical operation with a second signal and a second scrambling code, the second scrambler comprising a second random number generator for executing the second logic operation with a second seed to generate the second scrambling code, wherein the first seed and the second seed are different elements of a same set of seeds, each element of the set of seeds being utilized by each of the first and the second random number generators in turn;

a first transmission port coupled to the first scrambler for transmitting only the first transmission signal to a network node; and a second transmission port coupled to the second scrambler for transmitting only the second transmission signal to another network node.

2. The network interface circuit of claim 1 wherein the first seed and the second seed are different so that the first scrambling code and the second scrambling code are unlike.

3. The network interface circuit of claim 2 capable of updating the value of the first seed after a predetermined period after the first scrambler generates the first transmission signal, and capable of updating the value of the second seed after the predetermined period after the second scrambler generates the second transmission signal.

4. The network interface circuit of claim 3 in which the first scrambler generates the first transmission signal after receiving a first reset signal, and the second scrambler generates the second transmission signal after receiving a second reset signal, wherein the first reset signal and the second reset signal are transmitted to the first scrambler and the second scrambler respectively at different times so that the first scrambler and the second scrambler start to generate the first transmission signal and the second transmission signal respectively at different times.

5. The network interface circuit of claim 4 capable of setting an initial value to the first seed when the first scrambler receives the first reset signal and another initial value to the second seed when the second scrambler receives the second reset signal.

6. The network interface circuit of claim 1 further comprising a first encoder and a second encoder for encoding the first transmission signal and the second transmission signal respectively in the same way, the encoded first transmission signal and the encoded second transmission signal being transmitted to the corresponding network nodes through the first and second transmission ports, wherein the first encoder and the second encoder encode a signal composed of 0 and 1 values to one composed of 0, 1, and 1 values.

7. A network interface circuit for transmitting signals to different nodes of a network; the network interface circuit comprising:
a reset circuit for generating a first reset signal and a second reset signal;
a first signal circuit coupled to the reset circuit and comprising at least a first scrambler and generating a first transmission signal by utilizing the first scrambler to execute a logical operation with a first signal and a first scrambling code when receiving a first reset signal, the first scrambler comprising a first random number generator for executing a second logic operation with a first seed to generate the first scrambling code;
a second signal circuit coupled to the reset circuit and comprising at least a second scrambler and generating a second transmission signal by utilizing the second scrambler to execute the logical operation with a second signal and a second scrambling code when receiving a second reset signal, the second scrambler comprising a second random number generator for executing the second logic operation with a second seed to generate the second scrambling code, wherein the first seed and the second seed are different, non-equal elements of a same set of seeds utilized by each of the first and the second random number generators;
a first transmission port coupled to the first scrambler for transmitting the first transmission signal to a network node; and
a second transmission port coupled to the second scrambler for transmitting the second transmission signal to another network node.

8. The network interface circuit of claim 7 in which the reset circuits generate the first reset signal and the second reset signal at different times so that the time of the first signal circuit to generate the first transmission signal and the time of the second signal circuit to generate the second transmission signal are not the same.

9. A method for a network interface circuit to transmit signals to different nodes of a network, the method comprising:
generating a first scrambling code according to a first seed number;
generating a second scrambling code according to a second seed number, the first seed and the second seed being different elements of a same set of seeds;
utilizing each element of the set of seeds to be the first seed number and to be the second seed number in turn;
executing a logical operation with a first signal and the first scrambling code to generate a first transmission signal, and executing the logical operation with a second signal and the second scrambling code to generate a second transmission signal, wherein the second scrambling code is different from the first scrambling code so the first transmission signal and the second transmission signal are different even when the first signal is equal to the second signal; and
transmitting the first transmission signal to a node of the network and the second transmission signal to another node of the network respectively.

10. The method of claim 9 in which the value of the first seed is updated after a predetermined period after the first transmission signal is generated, and the value of the second seed is updated after the predetermined period after the second transmission signal is generated.

11. The method of claim 10 in which the first transmission signal is generated after receiving a first reset signal, and the second transmission signal is generated after receiving a second reset signal, wherein the first reset signal and the second reset signal turn on the process of generating the first scrambling code and the process of generating the second scrambling code at different times, so that the first transmission signal and the second transmission signal are generated at different times.

12. The method of claim 11 in which the first seed is set to an initial value when the first reset signal is received, and the second seed is set to another initial value when the second reset signal is received.

13. The method of claim 9 capable of encoding the first transmission signal and the second transmission signal respectively in the same way, the encoded first transmission signal and the encoded second transmission signal being transmitted to the corresponding network nodes through two transmission ports, the way of encoding is to encode a digital signal composed of 0 and 1 values to one composed of 0, 1, and −1 values.

14. A method for a network interface circuit to transmit signals to different nodes of a network, the method comprising:
generating a first scrambling code according to a first seed number;
generating a second scrambling code according to a second seed number, the first seed and the second seed being different, non-equal elements of a same set of seeds;
utilizing each element of the set of seeds to be the first seed number and to be the second seed number in turn;
receiving a first reset signal and a second reset signal;
executing a logical operation with a first signal and the first scrambling code to generate a first transmission signal right after receiving the first reset signal, and executing the logical operation with a second signal and the second scrambling code to generate a second transmission signal right after receiving the second reset signal, wherein the second transmission signal are different from the first transmission signal; and
transmitting the first transmission signal to a first node of the network and the second transmission signal to another node of the network respectively.

15. The method of claim 14 generating the first reset signal and the second reset signal at different times respectively so that the times to generate the first transmission signal and the second transmission signal are different.

* * * * *